Patented Mar. 7, 1933

1,900,407

UNITED STATES PATENT OFFICE

LARS O. GRONDAHL AND ANDREW J. SORENSEN, OF PITTSBURGH, PENNSYLVANIA, ASSIGNORS TO THE UNION SWITCH & SIGNAL COMPANY, OF SWISSVALE, PENNSYLVANIA, A CORPORATION OF PENNSYLVANIA

ELECTRIC CONTROL SYSTEM

Application filed April 16, 1931. Serial No. 530,580.

Our invention relates to electric control systems, and particularly to electric control systems making use of a carrier frequency current modulated by different combinations of low frequency currents.

We will describe certain forms of apparatus embodying our invention, and will then point out the novel features thereof in claims.

Figure 1:
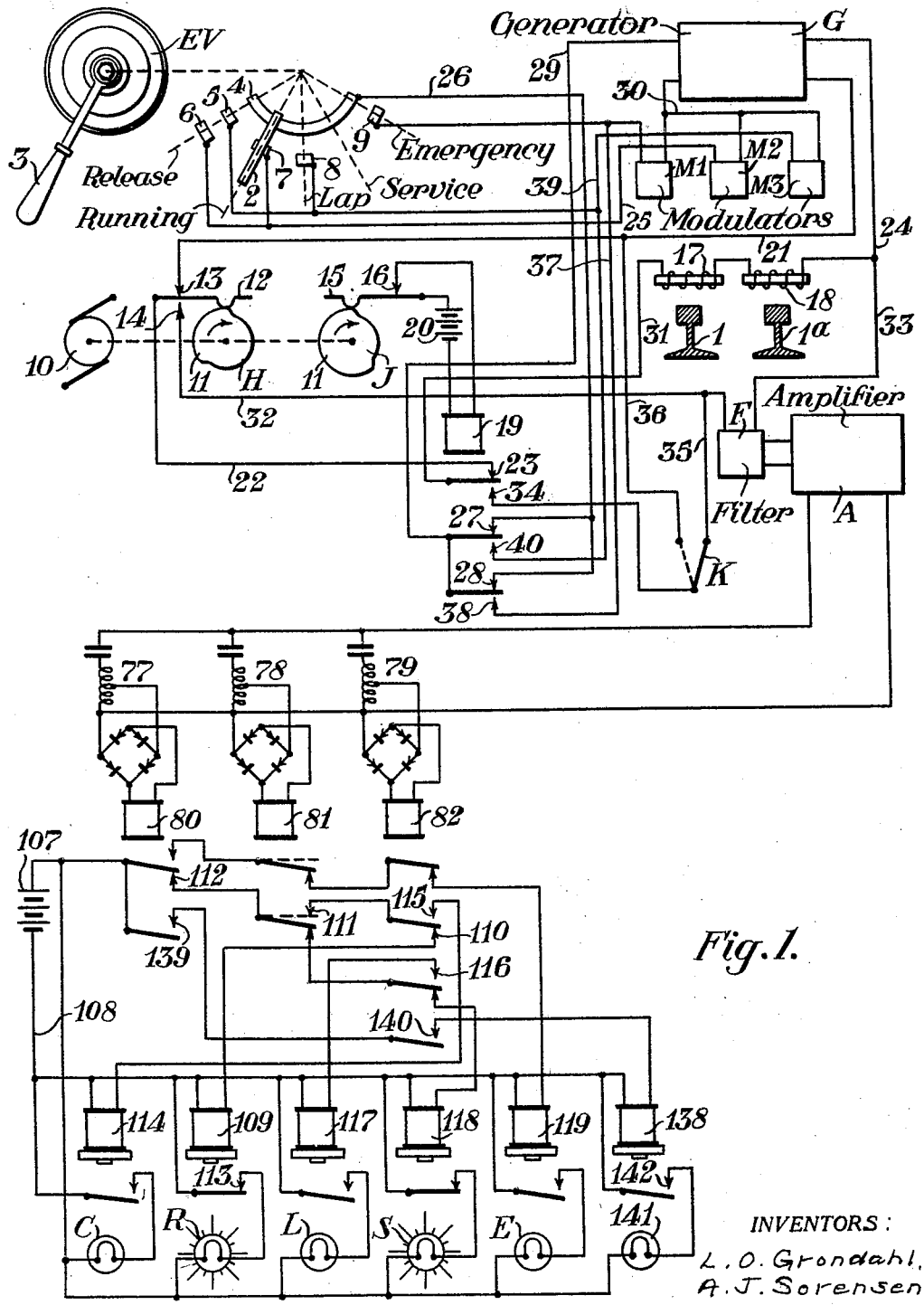
Figure 2:
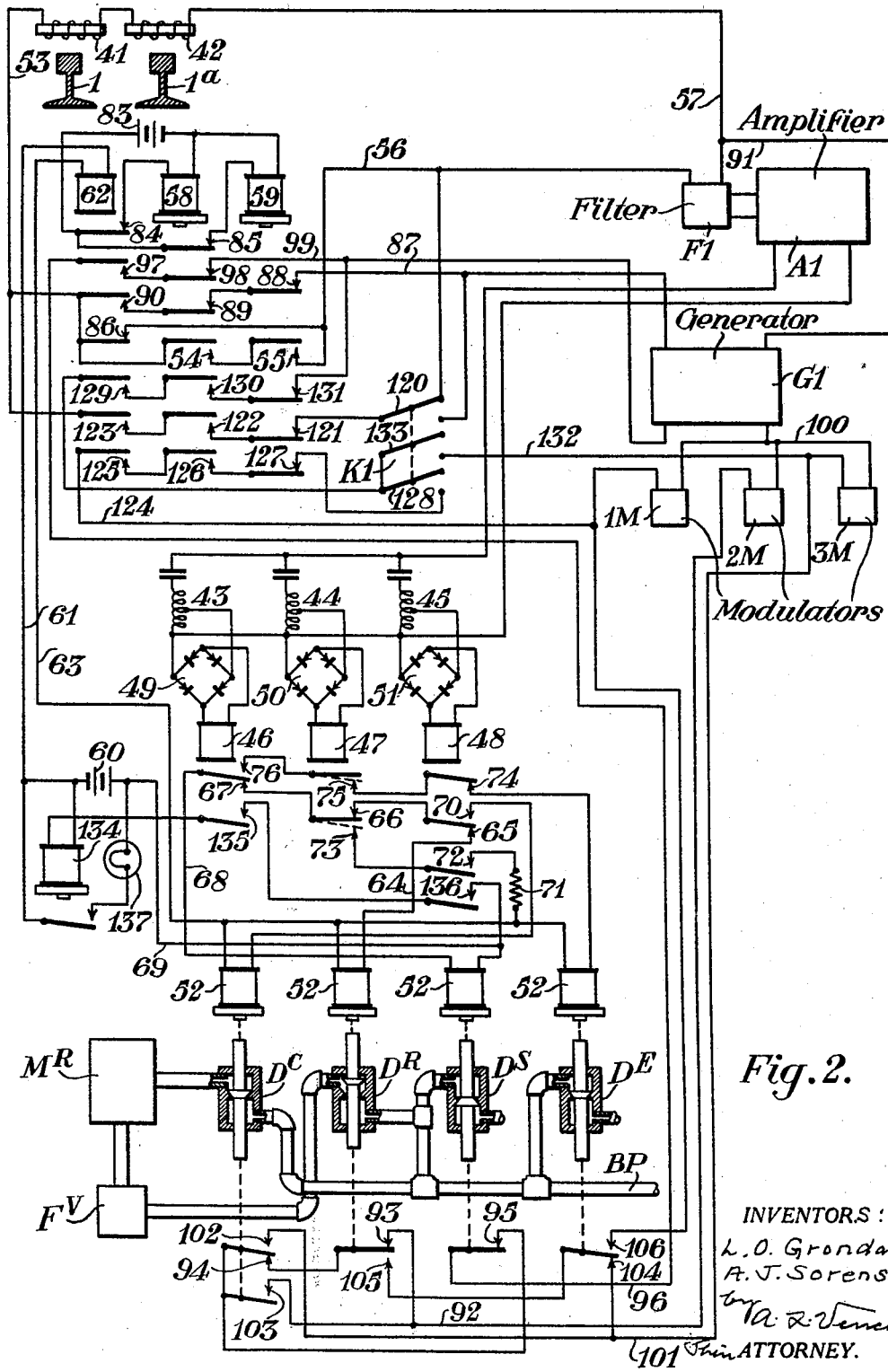

In the accompanying drawings, Fig. 1 is a diagrammatic view of the apparatus at the control point of a train brake control system embodying our invention. In this instance, the control point is shown as being on the locomotive, and the control apparatus is governed by the position of the usual engineer's brake valve. Fig. 2 is a diagrammatic view of the apparatus to be located at another point on the train to control an auxiliary brake controlling mechanism adapted to reproduce the usual functions of the engineer's brake valve on the locomotive. The apparatus of Figs. 1 and 2 also provides that an indication be returned from the auxiliary apparatus to the locomotive to inform the engineman of the condition of the auxiliary mechanism. Furthermore, the apparatus shown in these views provides for the exchange of other signals between the two locations. While the position of the apparatus of Fig. 2 may be at any point on the train, it will be considered in this specification as being mounted in the caboose of a freight train. Also it will be understood that our invention is not limited to this specific type of control systems but is equally adapted to other places where it is desired to transmit a plurality of different control influences between two points, and the form of our invention shown in the Figs. 1 and 2 will serve to illustrate all the different places where our invention might be employed.

Referring to Fig. 1, the reference character EV designates the standard type of engineer's brake valve capable of producing the "release", "running", "lap", "service" and "emergency" conditions of the brake pipe pressure. As shown schematically, a contact member 2 is operatively connected to the handle 3 of the valve EV and is adapted to engage an arcuate contact member 4 in all positions of the valve. The member 2 is also adapted to engage the contacts 5 and 6 when the handle 3 occupies the release position and to engage the contacts 7, 8 and 9 when the handle 3 occupies the running, lap and emergency positions respectively.

The locomotive apparatus includes two cams H and J of any suitable insulating material rigidly mounted on a shaft indicated by a dotted line. This shaft is driven preferably through gears by a motor 10 supplied with power from any convenient source such as the headlight generator not shown. Each cam is provided with a raised portion 11 which for cam H extends for one-third of the circumference while for the cam J, it extends for two-thirds of the circumference. The cam H is arranged to engage the contact spring 12 to raise it into engagement with a front contact 13 during the interval that its raised portion 11 engages the spring 12 and permits the spring 12 to break contact with 13 and engage a back contact 14 during the interval the raised portion 11 is out of engagement with 12. The cam J is adapted to engage a similar contact spring 15 to bring it into engagement with a front contact 16 during the interval the raised portion 11 of J engages the spring 15 and permits 15 to break contact with 16 during the interval the raised portion 11 is out of engagement with 15. By means of these cams, time is divided into alternate periods or intervals. With the cams rotated from the position shown in the figure in the direction indicated by the arrows, the first one-third of a rotation of cam H holds the spring 12 in engagement with the front contact 13, and the cam J closes the contact between the spring 15 and the contact point 16. This first one-third of a rotation represents the first period or interval of time. At the end of the first one-third rotation, the raised portion 11 of H passes beyond the spring 12 and it breaks contact with 13 and engages the back contact 14, but cam J still retains 15 in engagement with 16 for the second one-third of a rotation.

The second one-third of a rotation represents the second period or interval. At the end of the second interval, the raised portion 11 of J moves away from 15 and it breaks contact with 16 but the spring 12 associated with H does not change its position. At the end of a complete rotation, both 12 and 15 are brought back to the position shown in the figure. The last one-third of a rotation represents the third period or interval. With the cams constantly rotated by the motor 10 in the direction indicated by the arrows these three periods or intervals are successively repeated. As will appear later, the first period is utilized to send a control impulse from the locomotive to the caboose and will be referred to as the control period. The second interval is utilized to return an indication impulse from the caboose to the locomotive and will be referred to as the indication period. The third interval is used to transmit signals between the two locations and will be called the signal period.

The locomotive equipment also includes a generator G of carrier frequency current such, for example, as five thousand cycles per second. This carrier current is modulated by one or more of three low frequency currents furnished by the modulators M1, M2 and M3 which, for example, may be of twenty, thirty and forty cycles per second, respectively. This generator and the modulators may be one of the many well-known types, among them being the vacuum tube type. As neither the generator nor the modulators form a part of our invention, they are indicated in the figure by a rectangle only in order to simplify the drawing. It will be understood, of course, that our invention is not limited to the above-mentioned frequencies but that these frequencies are given merely by way of illustration. The locomotive is further provided with an input filter F and an amplifier A which may be one of the many well-known types, and as they also form no part of our invention, they are shown in the figure only by a symbol in order to not unduly complicate the drawing.

The input circuit of the filter F and the output circuit of the generator G are at times connected to inductor coils 17 and 18 located in inductive relation with the traffic rails 1 and 1ª, respectively. Suppose that the valve EV is at the running position and that the cams H and J momentarily occupy the positions as shown in the figure: The relay 19 is energized by current from the battery 20 through the front contact 16 and spring 15 of the cam J as will be evident by an inspection of the Fig. 1. With relay 19 energized, the output circuit of the generator G is completed from one terminal of G along the wire 21, contact point 13, spring 12, wire 22, front contact 23 of the relay 19, wire 31, coils 17 and 18, and wire 24 to the opposite terminal of G. A modulating frequency is supplied to the generator G by the modulator M2 through wire 25, contacts 7, 2 and 4, wire 26, contacts 27 and 28 in parallel, wire 29, generator G and wire 30 to the opposite terminal of M2. At the end of the first one-third of a rotation, that is, at the end of the control period, the cam H will have rotated to the point where its spring 12 drops into engagement with the back contact 14 and away from the front contact 13. The opening of the contact 13 opens the output circuit of the generator G to discontinue the supply of modulated carrier current to the inductor coils 17 and 18. As cam J has not changed the position of its contacts, the coils 17 and 18 are now connected to an input circuit that extends along wire 31, front contact 23 of relay 19, wire 22, spring 12, back contact 14, wire 32, filter F and wire 33 to the opposite terminal of the inductor coils 17 and 18. At the end of the second one-third of a rotation, that is, at the end of the indication period, the spring 15 drops to break contact with its front contact 16 and the relay 19 then becomes deenergized. As relay 19 becomes deenergized, its front contact 23 is opened and the input circuit just pointed out is ruptured. Also the modulated frequency supplied to the generator G from modulator M2 through the front contacts 27 and 28 is now discontinued. However, the inductor coils 17 and 18 are now provided with a circuit to the filter F along the wire 31, back contact 34 of relay 19, a manually operated controller key K when positioned in its full line position as shown in the figure, wires 35 and 32, filter F and wire 33 to the other terminal of the coils 17 and 18. At the end of the third one-third rotation—that is, at the end of the signal period the cams return to the position as shown in the figure and the output of the generator G is again closed and modulating frequency again supplied to the generator by the modulator M2. During the signal period, if the key K is shifted to the position indicated by the dotted line, the output of the generator G is connected to the coils 17 and 18 through the wires 21 and 36, key K, back contact 34 of relay 19, wire 31, coils 17 and 18, and wire 24 to the opposite terminal of the generator G. It follows that during the signal period, the operator can elect to either send or receive by means of the manually operated key K. As the relay 19 is deenergized during the signal period, the modulating frequencies of both M1 and M3 are supplied to the generator G. The circuit for the modulator M1 is completed along the wire 37, back contact 38, wire 29, generator G and wire 30 to the opposite terminal of M1. The circuit for the modulator M3 includes wire 39, back contact 40 and then as before traced for M1.

In the event the handle 3 is placed at the release position the modulators M2 and M3 are both made active to supply a modulating frequency to the generator during the control period through the contacts 6 and 5, respectively, as will be apparent from the Fig. 1. At the lap position of the handle 3, the contact 2 engages the arcuate member 4 and the contact 8 and the modulator M3 alone is rendered active to supply a modulating frequency to the generator G. Again at the emergency position of the handle 3, the contact member 2 engages 4 and 9 and the modulator M1 is rendered active during the control period to supply a modulating frequency to the generator. It will be noted that at the service position of the brake valve, none of the modulators are active during the first period and the current supplied to the traffic rails through the coils 17 and 18, is a non-modulated carrier current.

Referring now to Fig. 2, the caboose is provided with inductor coils 41 and 42 mounted in an inductive relation with the traffic rails 1 and 1$^a$ in a manner similar to the coils 17 and 18 at the locomotive. The coils 41 and 42 are at times connected to the input circuit of a filter F1 through which the current picked up from the traffic rails is applied to an amplifier A1. The filter F1 and the amplifier A1 may be and preferably are similar to the filter F and amplifier A on the locomotive. The output of the amplifier A1 is transmitted to a selecting network consisting of three sharply tuned circuits 43, 44 and 45 which operate the direct current relays 46, 47 and 48, respectively. These circuits 43, 44 and 45 are tuned, respectively, to the modulating frequency of the modulators M1, M2 and M3 of Fig. 1. Thus with a carrier current modulated at the frequency of M1 picked up by the coils 41 and 42 and applied to the amplifier A1, the circuit 43 is responsive to supply a substantially unidirectional current to the relay 46 through the full-wave rectifier 49 to energize that relay. Likewise, if the carrier current is modulated at the frequency of M2, the tuned circuit 44 is responsive to apply current to the relay 47 through the full-wave rectifier 50 to energize that relay. Also when the modulating frequency of M3 is present in the carrier current, the tuned circuit 45 is active to supply a current to the relay 48 through the rectifier 51. It follows then that whichever modulating frequencies are applied to the carrier current sent out by the locomotive apparatus, the corresponding relays in the caboose are energized. With the carrier current periodically interrupted as it is by the cam H, the relays 46, 47 and 48 are operated in step with the interruptions depending upon which modulating frequencies are present. If the carrier current is modulated by all three, then all three of the relays are operated; if the carrier current is modulated by only one, then the associated relay is operated. If the carrier current is non-modulated, then none of the relays respond. From the above discussion, it is apparent that the relays 46, 47 and 48 form a selective group of code following relays.

The caboose is provided with a main reservoir $M^R$, a feed valve $F^V$ and a plurality of electropneumatic valves D adapted to reproduce the functions of the engineer's brake valve on the locomotive. It will be understood that the caboose is further provided with the compressor and associated apparatus to insure a proper supply of air pressure in the main reservoir $M^R$. The valves $D^C$, $D^R$ and $D^E$ are each biased to a closed position and each is opened when its associated magnet 52 is energized. The valve $D^S$ is biased to an open position and is closed when its associated magnet 52 is energized. When the valve $D^C$ is opened, that is, when its magnet is energized, the main reservoir $M^R$ is connected to the brake pipe BP and the mechanism in the caboose then reproduces the condition which exists on the locomotive when the engineer's brake valve is at the release position. With the valve $D^R$ open, then the brake pipe is connected to the feed valve $F^V$ and the mechanism thereby reproduces the control existing on the locomotive when the engineer's valve is in the running position. When the valve $D^S$ is opened, that is, when its magnet 52 is deenergized, the brake pipe is connected to the atmosphere through a vent of such characteristics as to produce a reduction in the brake pipe pressure at substantially the service rate of the usual brake valve to effect the service application of the brakes. When the valve $D^E$ is energized, then the brake pipe is connected to the atmosphere through a vent of such characteristics as to cause an emergency rate of reduction of the brake pipe pressure and an emergency application of the brakes. When the valve $D^S$ is energized and the remaining valves all deenergized, both the supply and exhaust to the brake pipe are blanked and the mechanism in the caboose reproduces the lap condition of the brake valve on the locomotive. The several magnets 52 are selectively controlled by the modulation frequency operated relays 46, 47 and 48. Each of the magnets 52 is made slow-releasing so that the corresponding valve is continuously retained in the position corresponding to the energized position when the magnet is intermittently energized due to a periodic operation of the controlling relay.

In describing the control of the brake mechanism, let us assume that the engineman places the brake valve handle 3 at the running position, as shown in Fig. 1. As previously pointed out, the running condition of the apparatus of Fig. 1 causes the output of the generator G to be closed during the first one-third of each rotation of the cams and also supplies a modulating frequency to the generator from the modulator M2. That is to say, under running conditions, the traffic rails 1 and 1ᵃ are supplied with a carrier current modulated at the frequency of M2 during each control period. When this modulated carrier current is picked up by the coils 41 and 42 at the caboose, it is applied to the amplifier A1 through the filter F1 by a circuit that extends from one terminal of the inductor coils along wire 53, back contact 54 of a relay 58 to be described later, back contact 55 of a relay 59, wire 56, filter F1 and wire 57 to the opposite terminal of the inductor coils. As the circuit 44 is tuned to respond to the frequency of M2, the relay 47 is energized during each control period and is deenergized during the interval between the incoming current impulses. When the relay 47 picks up, current is supplied from the battery 60 along wire 61, winding of a relay 62, wire 63, magnet 52 of the valve $D^R$, wire 64, back contact 65 of the relay 48, front contact 66 of the relay 47, back contact 67 of relay 46, wire 68, magnet 52 of the valve $D^S$, and wire 69 to the opposite terminal of the battery 60. It follows then that under the running position of the handle 3 on the locomotive, the relay 47 on the caboose is picked up during each control period as determined by the cam H to supply an energizing impulse of current to the relay 62 and to the magnets of $D^R$ and $D^S$ in series causing thereby the auxiliary brake controlling mechanism to establish the running condition of the brakes. The relay 47 and, in turn, the relay 62 are operated in step with the incoming impulses of the modulated carrier current, but the slow-release characteristics of the magnets 52 of both $D^R$ $D^S$ retain these valves energized as long as the incoming impulses continue to occur at the predetermined intervals.

In the event the handle 3 of the brake valve EV is placed at the release position by the engineman, then the carrier current supplied to the traffic rails 1 and 1ᵃ during each control period is modulated at the frequencies of M2 and M3 and both relays 47 and 48 in the caboose operate in step with each incoming impulse. With both relays 47 and 48 picked up, a circuit is closed from battery 60 along wire 61, winding of relay 62, wire 63, magnet 52 of the valve $D^C$, front contact 70 of the relay 48, front contact 66 of the relay 47, back contact 67 of the relay 46, wire 68, magnet 52 of valve $D^S$ and wire 69 back to the battery 60. Thus under the release condition of the brake valve EV on the locomotive, the relays 47 and 48 in the caboose are operated and in turn the relay 62 rendered active and the auxiliary brake mechanism caused to establish the release condition of the brakes. Again should the engineman select the lap position of the handle 3, then the carrier current is modulated at the frequency of M3 and the impulses picked up at the caboose operate the relay 48 only, with the result that each time relay 48 picks up, a circuit is completed from the positive terminal of battery 60 along wire 61, relay 62, wire 63, resistance 71, front contact 72 of relay 48, back contact 73 of relay 47 and then as before traced to the opposite terminal of the battery 60 through the magnet 52 of the valve $D^S$. Thus we see that when the lap position is set up on the locomotive, the relay 48 on the caboose is operated to operate, in turn, the relay 62, and to cause the auxiliary brake mechanism to establish the lap condition of the brakes. Let us again assume that the emergency position of the brake valve EV is selected by the engineman. With the contact 2 engaging 4 and 9, the carrier current supplied to the traffic rails is modulated by the frequency of M1, and when these modulated carrier current impulses are picked up at the caboose, the relay 46 is operated. Each time relay 46 picks up, an energizing impulse of current is supplied from the battery 60 along the wire 61, relay 62, wire 63, magnet 52 of the valve $D^E$, back contacts 74 and 75 of relays 48 and 47, respectively, front contact 76 of relay 46 and then back to the negative terminal of battery 60 through the magnet 52 of the valve $D^S$. From the foregoing discussion, it is apparent that the impulses of modulated carrier current, be they modulated by one or by a plurality of modulated frequencies, when supplied to the traffic rails at the locomotive are picked up at the caboose and amplified to selectively operate controlling relays in step with the impulses of the modulated carrier current.

With our system, there is provided a return indication from the caboose to the locomotive to inform the locomotive driver whether or not the brake condition he has selected is being received at the caboose. This necessitates that a sending apparatus be provided in the caboose and a receiving apparatus on the locomotive. Looking again at the Fig. 1 and recalling that it was previously pointed out that the inductor coils 17 and 18 are disconnected from the generator G during the second period and connected to the input circuit of the filter F, it will be seen that the input energy supplied to this input circuit is amplified by the amplifying device A and then applied to a selective network consisting of three sharply tuned circuits 77, 78 and 79, similar to the circuits 43, 44 and 45, respectively, of Fig. 2. That is to say, the circuit 77 responds to a modulated frequency equivalent to that supplied by the modulator M1, while 78 responds to the frequency of M2 and 79 responds to a frequency equivalent to that supplied by M3. These tuned circuits are arranged to operate the respective controlling relays 80, 81 and 82 in the same manner as the tuned circuits in the caboose operate their controlling relays and it is thought that they need no further description. Circuits controlled by these relays 80, 81 and 82 control, in turn, slow-releasing relays that govern indicating devices C, R, L, S and E as will be shortly described. Turning back again to Fig. 2, the caboose is provided with a generator G1, which is preferably similar to the generator on the locomotive and also three modulators 1M, 2M and 3M, respectively, similar to the modulators M1, M2 and M3.

The equipment for synchronizing the caboose apparatus with the three periods established by the cams H and J on the locomotive consists of the relays 62, 58 and 59. In other words, these relays change the caboose apparatus so as to divide the time between the receipt of the brake controlling impulse, sending of a return indication impulse and the sending or receiving of a communicating impulse, in synchronism with the locomotive equipment. Relay 62 is energized in series with the brake controlling magnets and since it is a non-slow-releasing relay, it will be in its energized position only while the impulse for actuating the controlling relays is coming in from the locomotive. Relay 58 is energized by current from the battery 83 through the front contact 84 of relay 62, and then, in turn, the relay 59 is energized by current from 83 through the front contact 85 of relay 58. After 62 drops at the end of the incoming impulse, the relay 58 will stay up during its slow-release period and then after relay 58 drops, the relay 59 will remain up during its release period. The release periods of relays 58 and 59 are made substantially equal to the duration of a period of the cams H and J on the locomotive. That is, they are made substantially equal to the time required for the cams to make one-third of a rotation. It follows that during the first period of the locomotive apparatus, all the relays 62, 58 and 59 are up and that during the second period, relays 58 and 59 are up, while during the third period only relay 59 is up. All three relays again are reenergized at the beginning of the next control period and their operation repeated. It is necessary therefore that the input circuit on the caboose be closed when relays 58 and 59 are deenergized, and also that it be closed while relay 62 is up. As previously traced, the input circuit is completed through the back contacts 54 and 55 of relays 58 and 59, respectively. An inspection of Fig. 2 discloses that a by-path is provided around these back contacts which includes the front contact 86 of the relay 62, so that the input circuit is held intact during the interval that the relays are all energized. As the relays 58 and 59 are up and the relay 62 down during the indication period, it is necessary to have the output circuit of the generator G1 closed under this condition. This output circuit can be traced from one terminal of the generator G1 along the wire 87, front contacts 88 and 89 of relay 59 and 58, respectively, back contact 90 of relay 62, wire 53, inductor coils 41 and 42, and wires 57 and 91 to the opposite terminal of G1.

To insure that the return indication not only means that the control impulse sent out by the locomotive has been received at the caboose, but that the proper valves have functioned, a series of contacts are mounted on the movable parts of the valves and adapted to make on their front contacts when the valves are energized and on their back contacts when the valves are deenergized. Through these contacts operated by the valves, the circuits for the proper modulating frequencies of the carrier current are controlled.

With the auxiliary brake mechanism in the running condition then the circuit for the modulator 2M is completed along wire 92, front contact 93 of valve $D^R$, back contact 94 of valve $D^C$, front contact 95 of valve $D^S$, wire 96, back contact 97 of the relay 62, front contact 98 of relay 58, wire 99, generator G1 and wire 100 to the opposite terminal of the modulator 2M. With the auxiliary mechanism at the release condition, then a circuit for modulator 3M is completed along wire 101, front contact 102 of valve $D^C$ and then as before traced to the wire 100 which is also connected to the other terminal of modulator 3M. Under the release condition, a circuit is also completed for the modulator 2M along wire 92, front contact 103 of valve $D^C$ and then as before traced to the wire 100 connected to the opposite terminal of 2M. Thus under the release condition of the auxiliary mechanism, the carrier current is modulated by both 2M and 3M. Under the lap condition of the auxiliary mechanism, a circuit for 3M is completed along wire 101, back contact 104 of valve $D^E$, back contact 105 of valve $D^R$, back contact 94 of valve $D^C$ and then as before traced. Under the service condition of the caboose mechanism, no circuit is completed for any of the modulators, but under the emergency condition, a circuit is completed for 1M through the front contact 106 of the valve $D^E$, back contacts 105 and 94 and then as before traced.

Assuming that the brake valve EV is placed in its running condition so that impulses of carrier current modulated by the frequency of M2 are sent out each control period to the caboose apparatus causing the valves $D^R$ and $D^S$ to be energized, and the relays 62, 58 and 59 to be operated as above described, then during the second or indication period, the caboose apparatus returns an indication impulse of carrier current modulated at the frequency of 2M. When this modulator carrier current is picked up by the inductors 17 and 18 at the locomotive and amplified by A, the relay 81 is operated due to the fact that the circuit 78 is tuned to respond to the modulating frequency of 2M. As the relay 81 picks up, it closes a circuit from battery 107 along the wire 108, slow-releasing relay 109, back contact 110 of relay 82, front contact 111 of relay 81 and back contact 112 of relay 80 to the opposite terminal of battery 107. With relay 109 energized to close its front contact 113, current is supplied to the indicating device R from the battery 107. It follows then that as long as the control handle 3 remains at the running position, the caboose apparatus reproduces the running condition of the brakes and the indicating device R on the locomotive continuously indicates that condition.

An analysis of the operation when the handle is placed at release position will disclose that the control impulses are modulated by M2 and M3 to operate relays 47 and 48 on the caboose thereby energizing valves $D^c$ and $D^s$. During the indication period, that is, when both relays 58 and 59 are up but relay 62 is down, the outgoing carrier current impulse supplied by the caboose apparatus is modulated by the frequencies of 2M and 3M causing the relays 81 and 82 on the locomotive to be operated, thereby completing a circuit to the relay 114 through the front contacts 115 and 111 with the result that the indicating device C is energized. A lap position of the handle 3 causes the outgoing impulses from the locomotive to be modulated by M3 and the return indication impulses to be modulated by 3M. This results in the relay 82 on the locomotive being operated to close its front contact 116 to energize the relay 117 so that the lap indicating device L is selected. Again under emergency position of the handle 3, the outgoing current impulses of the locomotive are modulated by M1 causing the relay 46 in the caboose to be operated to energize the valves $D^E$ and $D^S$ and thereby set up the emergency condition of the auxiliary mechanism. Under the emergency condition of the auxiliary mechanism, the return indication impulses are modulated by 1M causing relay 80 on the locomotive to be operated to energize the relay 119 and thereby select the indicating device E. The service valve $D^S$ of the auxiliary mechanism is normally energized under all operating conditions except for a service application of the brakes. On the locomotive, the relay 118 is controlled through a back contact of each of the relays 80, 81 and 82 as will be evident from an inspection of Fig. 1. The result is therefore that the relay 118 is normally retained energized when these relays are deenergized, and also when any of the relays are operated in step with incoming indication impulses. By having relay 118 thus normally energized, under each of the several operating conditions, the indicating device S is normally displayed together with one of the other indicating devices when release, running, lap or emergency condition prevails in the caboose and is displayed alone when the auxiliary mechanism is set in the service condition.

As brought out earlier in the specifications, the third period may be used for establishing communicating signals between the two locations. During the third period, the relay 19 on the locomotive is deenergized completing the circuit for the modulators M1 and M3 at its back contacts 38 and 40, respectively, while the shifting of the inductor coils 17 and 18 from the receiving circuit to the sending circuit is accomplished by actuating the key K from one to the other of its two positions. On the caboose during the third period, the relays 62 and 58 are deenergized but the relay 59 still remains up due to its slow-releasing characteristic. Under this set up of these relays, the input circuit to the filter F1 is normally completed through the circuit controller 120 of a manually operated key K1. This input circuit may be traced along wire 56, circuit controller 120, front contact 121 of the relay 59, back contacts 122 and 123 of the relays 58 and 62, respectively, wire 53, inductor coils 41 and 42 and wire 57 to the other terminal of F1. In the event the key K1 is depressed, then the circuit controller 120 opens the above traced input circuit and closes the output circuit for the generator G1 as will be readily observed by an inspection of Fig. 2. The depressing of key K1 also completes a circuit for both the modulators 1M and 3M. That for the modulator 1M is along the wire 124, back contacts 125 and 126 of relays 62 and 58, respectively, front contact 127 of the relay 59, circuit controller 128 also operated by key K1, back contacts 129 and 130, front contact 131, generator G1 and wire 100 to the opposite terminal of 1M; while the circuit for the modulator 3M can be traced along wire 132, circuit controller 133 of the key K1 and then as before traced for the modulator 1M. It is to be seen, therefore, that on the locomotive the carrier current during the signal period is modulated by both the frequencies of M1 and M3 and that the selecting of the receiving or the sending circuit is accomplished by the operation of the key K. On the caboose, the carrier current during the signal period is likewise modulated by the two frequencies of 1M and 3M and the selection between the output and receiving circuits is accomplished by the operation of the key K1. When carrier current impulses of M1 and M3 are received at the caboose, the relays 46 and 48 are both operated so that a circuit for the slow-release relay 134 is closed at the front contacts 135 and 136 of the relays 46 and 48, respectively. The energizing of the relay 134 closes the circuit to the signaling device 137 which may be a magnet, bell or a light. On the locomotive, the receipt of a carrier current impulse modulated by both 1M and 3M causes the relays 80 and 82 both to be operated. With both of the relays 80 and 82 operated, then a circuit to the slow-releasing relay 138 is completed at the front contacts 139 and 140. The energizing of the relay 138 supplies current from battery 107 through its front contact 142 to a signalling device 141 which may be a bell, a magnet or a light. As the relay 134 in the caboose and the relay 138 on the locomotive are made slow-releasing, it follows that as long as a signal impulse is sent each signal period from either location, the signaling device at the other location will be steadily energized. Thus by means of these two signaling devices and their associated apparatus, communication can be established between the two locations under all operating conditions of the system without interfering with the control or indication functions.

Such a control system as here disclosed is highly selective, as not only do the selective networks provide for selection between the different combinations of the modulating frequencies of the carrier current, but the relays operated thereby in response to the on and off periods of the incoming impulses also provide means for controlling devices that are selectively responsive to these interruptions which may readily be made to correspond to different codes. When the modulated carrier current of the control period or of the indication period is broken up into a code of impulses, then the control devices selectively controlled by the operating relays would be of the widely used and well-known decoding type. The selection under such an arrangement would be not only between the different combinations of modulating frequencies but also between the different codes.

Although we have herein shown and described only one form of our invention, it is understood that various changes and modifications may be made therein within the scope of the appended claims, without departing from the spirit and scope of our invention.

Having thus described our invention, what we claim is:

1. A control system including, a generator of carrier frequency current, means to supply a plurality of low frequency currents of different frequencies, manually controlled means to modulate the carrier current with different combinations of the low frequency currents, automatic means to periodically close the output circuit of said generator of carrier current, a receiving circuit influenced by said output circuit, a plurality of electroresponsive devices controlled by said receiving circuit selectively responsive to the different modulating frequencies and operated in step with the periodic closing of said output circuit, and control circuits selectively controlled by the different combinations of operated electroresponsive devices.

2. A control system including, a generator of carrier frequency current, means to supply a plurality of low frequency currents of different frequencies, a manually controlled means to selectively modulate the carrier current with the different low frequency currents, and automatic means to periodically close the output circuit of said generator of carrier current, a receiving circuit influenced by said output circuit, a plurality of electroresponsive devices controlled by said receiving circuit selectively responsive to the different modulating frequencies and operated in step with the periodic closing of said output circuit, and control circuits controlled by the operation of the electroresponsive devices.

3. A control system including, two spaced locations, mechanism for each location having a plurality of different operating functions, a receiving and controlling means at each location selectively responsive to different combinations of modulating frequencies of a carrier current to selectively control the associated mechanism, a source of carrier current at each location, means to impress different combinations of modulating frequencies on each of said carrier currents, a transmitting means associated with each location to convey the modulated carrier current of its location to the receiving and controlling means of the other location, and automatic means to alternately connect the two transmitting means to their respective source of carrier current for predetermined intervals.

4. A control system including, two spaced locations, an operating mechanism having a plurality of operating conditions at each of said locations, a controlling means at each location selectively responsive to different modulating frequencies of a carrier current to control the associated operating mechanism, a source of carrier current for each location, means to impress different modulating frequencies on said carrier currents, a transmitting and receiving means to automatically exchange impulses of the modulated carrier currents between said locations with each impulse of a predetermined duration, and slow acting means for causing simultaneous functioning of the operating mechanisms in response to such exchange of impulses.

5. A control system including, two spaced locations, an operating mechanism at one location having a plurality of operating conditions, an indicating mechanism at the other location having a plurality of indicating conditions, a controlling means at each of said locations selectively responsive to different modulating frequencies of a carrier current to selectively control the respective operating and indicating mechanisms, a source of carrier current at each location, means to impress different modulating frequencies on each carrier current, a transmitting and a receiving means to alternately exchange impulses of the modulated carrier currents between said locations with each impulse of a predetermined duration, and means for causing simultaneous functioning of the operating and indicating mechanism in response to such exchange of impulses.

6. A control system including, two spaced locations, an operating mechanism and a signaling mechanism at one location, a controlling means selectively responsive to different combinations of modulating frequencies of a carrier current to selectively control said operating and signaling mechanisms, a source of carrier current, means at the other location to successively impress automatically different combinations of modulating frequencies on the carrier current at periodic intervals, a transmitting and receiving means to convey the modulated carrier current to the controlling means, and slow acting means for causing simultaneous functioning of the operating and signaling mechanisms in response to such successive combinations of modulating frequencies.

7. A control system including, two spaced locations, an operating and a signaling mechanism at each of said locations, a controlling means at each of said locations selective responsive to different combinations of modulating frequencies of a carrier current to selectively control the associated operating and signaling mechanisms, a source of carrier current at each location, means at each location to successively impress different combinations of modulating frequencies on its carrier current at recurrent intervals, a transmitting and receiving means to alternately exchange impulses of the modulated carrier currents between the two locations, and means for causing simultaneous functioning of the operating and signaling mechanism of each location in response to the exchange of such successive combinations of modulating frequencies.

8. A control system for railways including, an auxiliary brake controlling mechanism located at one point on a train and adapted to establish the several brake controlling conditions, an indicating mechanism located at a second point and adapted to establish a distinctive indication for each condition of the brake controlling mechanism, a controlling means at each of said points selectively responsive to different modulating frequencies of a carrier current to selectively control the associated mechanism, a source of carrier current at each point, manually controlled means to impress different modulating frequencies on the carrier current at the second point, means controlled by the condition of the brake mechanism to impress different modulating frequencies on the carrier current at the first point, a transmitting and receiving means to alternately exchange impulses of the modulating carrier currents between said points with each impulse of a predetermined duration, and means for causing simultaneous functioning of the brake controlling mechanism and the indicating mechanism in response to such exchange of impulses.

9. A control system including, a transmitting circuit and a receiving circuit, a source of carrier frequency current, means to impress different combinations of modulating frequencies on said carrier current, means to supply said modulated carrier current to said transmitting circuit at recurrent intervals for causing an influence on said receiving circuit, and a plurality of electroresponsive devices controlled by said receiving circuit selectively responsive to the different modulating frequencies and operated in step with said recurrent intervals in accordance with the different combinations of modulation frequencies.

10. A control system including, a transmitting circuit and a receiving circuit, a source of carrier frequency current, means to impress different modulating frequencies on said carrier current, means to supply said modulated carrier current to said transmitting circuit at recurrent intervals for causing an influence on said receiving circuit, a plurality of electroresponsive devices controlled by said receiving circuit selectively responsive to the different modulating frequencies and operated in step with said recurrent intervals, and a control mechanism having a plurality of operating conditions selectively controlled by said electroresponsive devices.

11. A control system including, two locations spaced apart, a transmitting circuit and a receiving circuit at each location, a source of carrier current at each location, means to impress different combinations of modulating frequencies on each of said carrier currents, means at each location to supply the associated transmitting circuit with said modulated carrier current at periodic intervals to influence the receiving circuit at the opposite location, a plurality of electroresponsive devices at each location controlled by the receiving circuit and selectively responsive to the different modulating combinations, and sychronizing means to complete the receiving circuit at each location during the interval the modulated carrier current is supplied to the transmitting circuit at the other location.

12. A control system including, means located at one point for generating a carrier frequency current, means at said point for generating a plurality of different low frequency currents and for modulating said carrier current with different groups of said low frequency currents, means for periodically interrupting said current, a receiving means located at another point influenced by the modulated carrier current, a plurality of relays controlled by said receiving means selectively responsive to the different low frequencies and operated in step with said periodic interruptions, and a plurality of control circuits selectively controlled by the operated relays.

13. A control system comprising, a mechanism having a control, an indication and a signaling condition; an automatic means for causing said mechanism to successively assume each of said conditions with each condition prevailing for a pretermined interval and which includes, a device at a remote point to establish the control condition, and two local relays each having a slow release period substantially equal to said interval, energized during the control condition and deenergized successively at the end of said control condition, to establish the indication condition during the release period of the first relay, and to establish the signaling condition during the release period of the second of said relays.

14. A control system comprising in combination, a manually operated circuit controller having different positions, transmitting means located at said controller including a source of carrier current of one frequency modulated at different lower frequencies corresponding to the different positions of said controller, an operating mechanism at another point selectively responsive to the frequencies of modulation of said carrier current to produce different operating functions, transmitting means at the second mentioned point including a source of carrier current of one frequency modulated at different lower frequencies corresponding to the different functions of the operating mechanism, an indicating apparatus located at the controller selectively responsive to the frequencies of modulation of the second carrier current, synchronizing means to alternately exchange impulses of the modulated carrier currents between said two transmitting means, and means for causing simultaneous functioning of the operating and indicating mechanisms in response to such exchange of impulses.

In testimony whereof we affix our signatures.

LARS O. GRONDAHL.
ANDREW J. SORENSEN.